(12) United States Patent
Graf et al.

(10) Patent No.: US 7,346,448 B2
(45) Date of Patent: Mar. 18, 2008

(54) MEASURING ARRANGEMENT AND METHOD TO DETERMINE AT INTERVALS THE USABILITY POTENTIAL OF AT LEAST ONE OPERATIONAL FLUID IN AN ENGINE

(75) Inventors: Franz Graf, Graz (AT); Karol Schleifer, Judendorf (AT); Klaus-Christoph Harms, Thal/Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 11/085,597

(22) Filed: Mar. 22, 2005

(65) Prior Publication Data
US 2005/0216178 A1 Sep. 29, 2005

(30) Foreign Application Priority Data
Mar. 22, 2004 (AT) ............................ GM218/2004
Jun. 14, 2004 (AT) ............................ GM413/2004

(51) Int. Cl.
*G01M 15/00* (2006.01)
*G01N 33/26* (2006.01)
(52) U.S. Cl. ...................................... 701/114; 73/116
(58) Field of Classification Search ............... 701/114; 73/116
See application file for complete search history.

(56) References Cited

U.S. PATENT DOCUMENTS

| | | | |
|---|---|---|---|
| 4,570,069 A * | 2/1986 | Gager | 250/343 |
| 4,777,821 A | 10/1988 | Gerve | |
| 5,076,397 A * | 12/1991 | Yamada | 184/108 |
| 6,580,366 B1 | 6/2003 | Engfehr | |

FOREIGN PATENT DOCUMENTS

| | | |
|---|---|---|
| AT | 4139 | 2/2001 |
| EP | 0416267 | 3/1991 |
| EP | 1286161 | 2/2003 |

OTHER PUBLICATIONS

Koch, "Experience with Oil Consumption Measurements on the Engine Test Bed" in SAE Brasil 93, SEA Technical Paper Series, 931667E (Oct. 1993).

* cited by examiner

*Primary Examiner*—Arnold Castro
(74) *Attorney, Agent, or Firm*—Dykema Gossett PLLC

(57) ABSTRACT

A measuring and testing system for a test piece (1) with at least one operational fluid, particularly to test an internal combustion engine, is provided with at least one measuring arrangement connected to a space (2) of the test piece (1) containing operational fluid, and comprising a partial measuring arrangement (4, 5, 6) for the quantity parameter of the operational fluid and at least one additional partial measuring arrangement (6, 7) for at least one quality parameter for the characterization of the physical and/or chemical condition of the operational fluid, as well as a control and evaluation unit (6) connected to the measuring arrangement. An evaluation logic is implemented in the evaluation unit (6) whereby said evaluation logic links the quantity parameters with at least one condition parameter according to a pre-definable relationship and determines the usability potential of the operational fluid to be able to give in a systematic and simple manner also information about the admissibility and possible validity of the parameters of the operational fluids and possibly about other measuring and testing results.

25 Claims, 1 Drawing Sheet

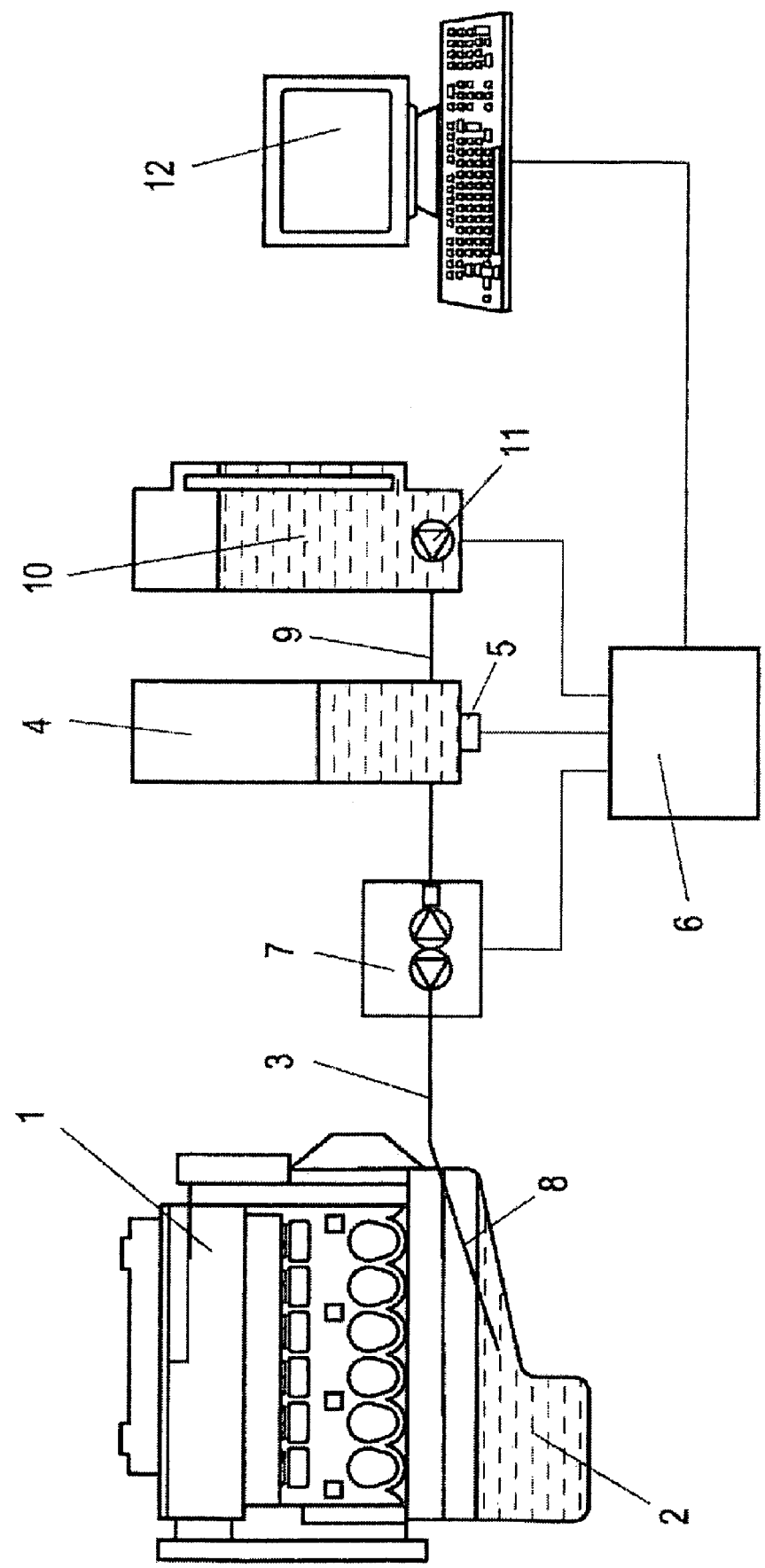

MEASURING ARRANGEMENT AND METHOD TO DETERMINE AT INTERVALS THE USABILITY POTENTIAL OF AT LEAST ONE OPERATIONAL FLUID IN AN ENGINE

BACKGROUND OF THE INVENTION

1. Field of the Invention

The invention relates to a measuring and testing system for a test piece having at least one operational fluid, particularly to test an internal combustion engine, with at least one measuring arrangement connected to a space of the test piece containing operational fluid, including a partial measuring arrangement for the quantity parameter of the operational fluid and at least one additional partial measuring arrangement for at least one quality parameter for the characterization of the physical and/or chemical condition of the operational fluid, as well as a control and evaluation unit connected to the measuring arrangement. The invention relates additionally to a measuring arrangement to determine at intervals the usability potential of at least one operational fluid used in an engine, to be used in the measuring and testing system having a connecting line to a space in the engine containing the operational fluid, a measuring vessel fillable with the operational fluid through a connecting line, an evaluation unit as well as a measuring and testing method for a test piece having at least one operational fluid, particularly to test an internal combustion engine, whereby there is determined a quantity parameter of the operational fluid and at least one condition parameter for the characterization of the physical and/or chemical condition of the operational fluid, and a method to determine at intervals the usability potential of at least one operational fluid employed in an engine to be used in such a measuring and testing method.

2. The Prior Art

Complex measuring and testing systems are required for research and development or for quality testing and diagnosis on complex engines, for example internal combustion engines, as well as reciprocating piston compressors, turbines, gearing and drive trains for vehicles, etc., which is to make thorough testing and optimizing of the machine possible. The operational fluids employed therein are of special significance in this connection, which are for example lubricating oil, cooling agents or possibly liquid, gaseous or powder-like motor fuels and combustion air. They have to be supplied to the engine in sufficient amounts and be of suitable condition and they are consumed during the operation of the engine. Consumption may occur in terms of quantity and/or condition whereby the cooling agent, for example, is normally not characterized by actual consumption in quantity but by the degree of flow capacity whereas the consumption during the combustion of motor fuel together with combustion air is practically complete in terms of quantity as well as in condition, while the consumption of lubricating oil occurs continuously with continuous deterioration in the way of a slow-moving alteration.

Measuring and testing systems are thereby often equipped with a number of corresponding measuring devices. They serve, on the one hand, to determine the quantity parameters of an operational fluid. Depending on the design and application, the actual intake flow, consumption flow, or flow-through can be determined as volume or mass per time unit, for example, or per operational cycle or accumulated value—or determined can be the quantity actually still remaining in the reservoir, or the difference in quantity or fluid level compared to the lastly measured value etc. On the other hand, measuring and testing systems are often equipped with measuring devices to determine the quantity parameters of the operational fluid, which make possible the characterization of the physical and/or chemical condition of the operational fluid. Such measuring devices and sensors to determine the condition parameters can also be installed into conditioning devices, for example, which serve for conditioning of temperature and pressure of the supplied motor fuel, or for conditioning of temperature, humidity and pressure of the supplied combustion air.

It is also basically known to mathematically link a quantity parameter to a condition parameter of the operational fluid and to determine in this way an additional, derived physical and chemical value of the operational fluid or an additional quantity or condition parameter. By multiplication of the quantity parameter of the "volume flow" with the condition parameter of the "density" one can often obtain the new quantity parameter of the "mass flow" for example. Or one can obtain the volume and the acoustic velocity of the flowing gas from the measured velocity of an ultrasound measuring system; and the actual gas density can be obtained from the acoustic velocity and the measured pressure as an additional condition parameter of the fluid so that the searched-for mass flow is obtained by multiplication of the volume flow and the density.

But in these cases, as in all known systems and devices, it is true that the quantity parameters and at least one condition parameter of the operational fluid are determined and evaluated separately and isolated, and whereby no information is given about the sensibility of a measurement under existing circumstances, about the validity of the determined values of quantity parameters, condition parameters and possibly other measuring and testing results.

Problems of special consideration relative to the quantity parameters appear particularly in the measurements of consumption of lubricating oils in modern internal combustion engines, which is of ever-increasing significance merely in view of the desired decrease in exhaust gas emission since lower oil consumption means a decrease of the amount of particles in case of a diesel engine and in view of an increase in service life of the exhaust gas treatment system.

For example, indicator methods are known in the measurement of oil consumption which determine the oil consumption in the exhaust gas through measurement of a component contained in the lubricating oil (e.g. radioactive substances, sulfur or the like) proportional to the consumption, which is above all expensive and relatively complicated in its application. In addition, there are devices and methods known with which oil consumption is determined with an oil level measurement directly in the crankcase sump of the internal combustion engine, for instance by means of suction systems based on a volumetric measurement. However, the measured values are negatively influenced by that change in oil density in this method and arrangement, which is cause by the change in oil temperature and foaming of the oil in the crankcase sump. In view of the low accuracy in measurement and the necessity to measure while the motor is turned off and the entire time needed to perform the measurement, there must be considered in its place a sensible application in production test benches, for example, to monitor the condition of the manufactured internal combustion engine. A part of these problems is avoided in known arrangements and methods of the aforementioned type by moving the oil level measurement to a communicating vessel outside of the internal combustion engine. With the aid of a predetermined calibration function, there can be determined the existing amount of lubricating oil or the amount of lubricating oil consumed between two measured values.

In arrangements of this type as disclosed, for example, in "SAE TECHNICAL PAPER SERIES 931667 E—Experience with Oil Consumption Measurements on the Engine Test Bed, Karl Köch, AVL List" or in DE 35 37 192 A1 or EP 0 416 267 A1, the connection of the measuring vessel to the internal combustion engine is made by means of an essentially horizontal connecting line starting from the oil plug disposed at the bottom of the oil pan of the internal combustion engine whereby the spaces above the lubricating oil of the internal combustion engine and the measuring vessel are connected to one another with a pressure compensation line.

In these methods and systems, which determine relatively rapidly, in general, low oil consumption values by means of a high discrimination in the oil level, avoided has to be disadvantage of the necessary complete draining of the motor oil and refilling of the entire system is necessary after installation of the connecting line and particular attention has to be paid to complete ventilation of the measuring system and proposed is therefore a connecting line having an adapter arrangement on the side of the internal combustion engine, such as the measuring arrangement disclosed in AT 4 139 U2, which can be inserted through an existing opening on the engine from the top into the crankcase sump and whereby its upwardly oriented intake area is essentially designed in the he way of a siphon. Adapting the connecting line leading to the communicating measuring vessel is thereby greatly simplified.

Nevertheless, situations or operational conditions of the engine may occur during the detection of the consumption of operational fluids or between measurements for the determination of consumption of specific operational fluids, such as lubricating oil in internal combustion engines, which change the condition of the operational fluid in such a manner that sensible quantity measurement or consumption measurements are no longer possible. For example, the consumption values can be falsified through the import of foreign substances into the operational fluid to be measured, for instance imported motor fuel or carbon particles into the lubricating oil, or through extreme foaming or chemical/physical changes in the operational fluid as a result of a lengthy continuous influence of high operational temperatures.

Any consumption measurement of an operational fuel is only informative and meaningful if the usability potential of the specific operational fluid is observed. This usability potential is determined through the quantity of operational fluid that is available for the engine, on the one hand, and its condition, on the other hand. As parameters for the characterization of the supply quantity is considered the existing or consumed mass, volume, fluid level, etc., while parameters for the evaluation of the condition can be temperature, density, viscosity, acoustic velocity, compressibility, specific electric conductivity, dielectric constants, magnetic permeability or susceptibility (ferromagnetic, paramagnetic or diamagnetic), opacity, and optical spectrum, etc. For example, import of motor fuel into the lubricating oil changes its density and viscosity, as it is also the case with extreme foaming. DE 101 49 852 A1 describes a method to calculate the decrease in quality of motor oil, which does not determine this decrease in quality from a measurement of the above-mentioned parameters but the decrease is derived from the actually measured change of the oil quantity. Linking of the quantity parameter and the condition parameter is thereby not possible. In contrast, EP 1 286 161 A2 discloses device merely for the detection of the quality of motor oil without considering a combination with the quantity parameter, which determines the oil temperature as well as at least one quality parameter by means of a multifunctional sensor. The parameter of the oil consumption in terms of quantity or the existing oil quantity is not considered.

Both parameters determining the usability potential of the operational fluid, namely the quantity as well as the condition, are independent in principle and one parameter can be kept respectively constant depending on the testing object and the other parameter can be observed—or the change of both parameters is monitored during the course of the test. For example, tested can be the quantity of consumption at a nearly constant condition—or tested can be degradation of the condition of the operational fluid at nearly constant quantity in supply.

Such information would be of high significance in the increasingly automated measuring and testing operation and it is the first object of the present invention to provide systems and methods of the aforementioned type to make possible a testing apparatus relative to the measurement-related determination of parameters of operational fluids and to give information in a systematic and simple manner about the permissibility or possible validity of the specific parameters of the operational fluids and possibly about other measuring and testing results. An additional object is to realize with such systems and methods the accuracy of gravimetric quantity determination or quantity determination at intervals known from prior art in another connection, which can also be attached and operated while the engine is running and make additionally possible the evaluation of the usability potential and give thereby information about the utility of the measured values or of the entire testing process.

SUMMARY OF THE INVENTION

In the achievement of the firstly cited object, an evaluation logic is implemented in the evaluation unit of the system according to the invention whereby the evaluation logic links the quantity parameters with at least one condition parameter according to a predefinable relationship, vectorial in each case, and determines the usability potential of the operational fluid. The usability potential can be mathematically viewed as an n-dimensional symptom vector of the operational fluid beginning at the zero point whereby the n-coordinates (n being greater than 1) are formed by the quantity parameter and at least one condition parameter. The existing or consumed mass, the volume, the oil level, etc., are taken into consideration as parameters for the characterization of the supply quantity, while parameters for the condition evaluation could be physical parameters such as temperature, density, viscosity, acoustic velocity, compressibility, specific electric conductivity, dielectric constants, magnetic permeability or susceptibility (ferromagnetic, paramagnetic or diamagnetic), opacity, optical spectrum, etc., or physico-chemical or chemical parameters such as degree of acidity (pH value), degree of oxidation, nitration, alkalinity, dispersion capability, foaming stability, content of air (quantity or concentration), readily volatile hydrocarbons, water vapor (humidity), water, antifreeze agent (often glycols), paraffin, tar, carbon, ash, metal particles, silicate (sand, dust), etc.

It has been actually shown that isolated monitoring of the individual measurable and determinable parameters of an operational fluid give no satisfactory information without reference to other parameters for permissibility or validity of these parameters or possibly for other measuring and resting results. In contrast, clearly more significant information can be given if the parameters determined by the measuring method, i.e., one quantity parameter and at least one condition parameter, are linked to information that is qualitative totally different from one of the measurable and determinable parameters, namely the usability potential, and if said information is evaluated and monitored and coupled together in this form as coordinates of a symptom vector.

Proper operation of the engine is not possible relative to the actual test goal in case of insufficient availability of operational fluid and/or poor condition of the operational fluid. In such a case, the measuring and testing results obtained from the engine are therefore invalid or are only of limited validity. Monitoring is necessary to recognize now such a faulty condition or its creeping or sudden appearance. There are now many possibilities relative to the operational fluid of the engine to be tested of how different effects overlap one another or even partially compensate, which would make simple and isolated monitoring of the measurable and determinable parameters by themselves less informative.

For example, there are now devices on board of newer motor vehicles which indicate whether the vehicle may be driven any further or how long the actually existing lubricating oil of the motor may still be used and when the next oil change will be due. These devices are an example of what is not meant with the present invention, namely isolated monitoring of the existing oil quantity, on the one hand, whether enough lubricating oil is present, which means more than the minimum amount and, on the other hand, an approximately detected possible degradation of the oil often based on an accumulated high-temperature operating period, with the goal to protect the engine from damaging operation. In case of the inventive measuring and testing device for research and development or in case of quality testing and diagnosis, for example, the issue is the usability potential of the operational fluid relative to the validity and usefulness of the achieved or achievable measuring results in the measuring and testing operations, which are often times already automated. In terms of the present example: having lubricating oil consumption that is too low or too high relative to the viscosity of the lubricating oil or possibly to additional parameters could make the test results worthless and such a case must be detected and indicated.

Consumption of lubricating oil can be actually zero or even become negative if an import of motor fuel occurs, e.g., gasoline. This so-called fuel-thinning of the lubricating oil could now only be detected through a viscosity measurement if thickening of the lubricating oil would not be possible based on an import of carbon particles into the oil compensating the thinning of the oil. This import of carbon particles could be taken into consideration through an additional condition parameter which would be determined by the opacity of the lubricating oil. In this case, attention would have to be paid that fuel-thinning is effective only at moderate oil temperatures since motor fuel evaporates from the lubricating oil at high temperatures. Nevertheless, high temperatures possibly cause partial coking of the oil so that the process of temperature-stress must also be taken into consideration under circumstances if an original condition with fresh oil cannot be depended on.

All parameters determining the usability potential, namely the quantity as well as the condition parameters, are independent from one another as generally viewed and one parameter can be kept constant depending on the respective test object and the other parameter can be observed—or the change of both parameters is monitored during the course of the test. For example, quantity consumption can be tested at a nearly constant condition or degradation of the condition of the operational fluid can be checked at a nearly constant quantity of supply. Coordinate transformations can be performed relative to additional measured values obtained on the test piece so that an improved discrimination is made possible for admissible and inadmissible conditions and for a more favorable illustration of monitoring. In case of a coolant, the heat capacity of the coolant can be determined with the aid of a model, for example, whereby the heat capacity is dependent on the content of antifreeze agent and the heat transfer potential can be determined by the degree of coolant flow and these values can be taken into consideration to determine the usability potential as well. The transferred amount of heat can be determined and further evaluated if the temperatures and heat transfers actually occurring in the engine are known, in addition. From the statements above it becomes clear that the usability potential is not a reversible definite value: several possible usability potentials may exist for the operational fluid of an engine in operation depending which measurement parameters are used at first and which coordinate transformations have been applied.

Similar effects as the ones mentioned above can also occur for other operational fluids. There is always shown that simple monitoring of one respective parameter, isolated from the others, cannot give the required amount of information; such as in case of the coolant whereby the content of an antifreeze agent plays a role in addition to the available quantity, for example, whereby the decreased cooling capacity of the antifreeze agent must be compensated through an increased or sufficiently high flow rate. This applies also to gasoline consumption, which is critical relative to the content of readily volatile hydrocarbon having a strong influence on ignition readiness, even if said gasoline consumption is determined to be a mass flow and not only a volume flow, whereby gasoline carries along micro-vapor bubbles, which result in an altered compressibility, among other things, and which in turn have a considerable influence on the fuel injection system.

One advantageous embodiment of the system is characterized in that a module is implemented in the evaluation logic, which compares and indicates deviations of the values of the usability potential with predefinable desired values or admissible ranges. It is possible thereby to assign to the symptom vector the usability potential and desired values discretely distributed in its value range and/or admissible ranges in the form of two-dimensional or multi-dimensional planes (depending how many condition parameters are linked to the quantity parameter) and to clearly identify unacceptable deviations during monitoring.

An especially favorable equipment-related design of the system is possible if at least one part of the measuring arrangement for the quantity parameter is also a part of the measuring arrangement of the condition parameter. This equipment-related combination of the two partial measuring arrangements is especially advantageous since they must already be in communication with the operational fluid and the possible special and equipment-related synergies are therefore constructively usable.

In addition, there are synergies to be advantageously used if at least one part of the measuring arrangement for the quantity parameter is linked in the way of the measuring technology to a part of the measuring arrangement for the condition parameter. This can occur, for example, through a common function control of the two partial measurement arrangements relating to one another so that the different measurements can be performed at timely intervals, advantageously simultaneously or close together in time. Or, the measurement-related coupling can be realized through an accessibility of the two measuring arrangements to stored parameters and/or measurement values—or, additional parameters can be determined from the primary determined parameters or the base parameters, for example as described above, and a mass flow can be determined from volume flow and density.

The second stated object is achieved in an inventive measuring arrangement for the above-described measuring system in that at least one supply measuring arrangement is provided which includes the measuring vessel equipped with a device to detect at least the momentary supply of the operational fluid available to the engine, and provided is also a condition measuring arrangement in which at least one condition parameter of the operations fluid is determined. The determination of the oil supply can be, in general, a determinable residual quantity whereby the residual supply quantity can be starting from zero up to nearly the maximal available quantity of operational fluid.

Since in many cases the momentary display of the level of the operational fluid is not sufficient, it is proposed according to an advantageous embodiment that the supply measuring arrangement is equipped with a device to determine the amount of operational fluid consumed by the engine.

According to an additional characteristic of the invention, it can advantageously be proposed that the supply measuring arrangement is connected to the engine with a connecting line, which is provided with an adapter that can be inserted on the side of the engine into an existing opening of the engine at a predetermined height, whereby a pump arrangement is placed in the connecting line, and whereby the detection determination is made of the amount of operational fluid consumed by the engine from successive measurements in and evaluation unit of the measuring arrangement. The measuring vessel can thereby be arranged at any desired height relative to the engine and the fluid to be measured can be drawn through the connecting line and through the accessible opening during the operation of the engine so that the engine does not have to be stopped.

The supply measuring arrangement comprises advantageously a pressure sensor on the bottom of the measuring vessel to detect the amount of operational fluid contained in the measuring vessel whereby the pressure sensor is connected to an evaluation unit. Compensation of zero-point drifting of the sensor is made possible thereby through taring or resetting of the pressure sensor before each measurement, which means, before each drawing of the fluid from the engine. The amount of operational fluid running down from the walls of the measuring vessel to the sensor can also be taken into consideration at intervals or between the successive measurements.

Pressure switches or leveling switches to determine the amount of fluid to be drawn can be avoided if the pump arrangement is connected to the evaluation unit into which a program has been implemented and which determines during the suction operation of the pump arrangement the time gradient of the pressure values supplied by the pressure sensor and whereby the program turns the pump arrangement off after a defined interval and after values fall below a freely determinable threshold value. The determination of the amount to be suctioned-off occurs through the detection of the fill-level gradient in the measuring vessel realized by way of software or through a hard-wired circuit. However, the pressure gradient can also be used for information about the condition of the operational fluid since its rate-of-rise gives information about the density of the operational fluid or it shows density changes relative to other measurements in the changes of rate-of-rise. From the above statement it is also clear that the supply measuring arrangement and the condition measuring arrangement are functionally different arrangements but they can be together or at least overlap one another in terms of equipment if they can detect the oil level in the measuring vessel and at least a relative density change as it occurs in the pressure sensor arrangement.

Consumed operational fluid can be replenished immediately after the completion of each measurement for the safety of the engine in an embodiment according to the invention wherein the measuring vessel is connected to a reservoir filled with operational fluid used in the engine through a closable connecting line in which a pump arrangement can possibly be provided. In addition, an exactly defined amount of operational fluid, which can be conditioned in any manner, can be placed into the measuring vessel after each measurement to protect the pressure sensor against a temperature shock caused by the operational fluid flowing from the engine.

In this especially advantageous embodiment it is therefore further proposed that the shut-off element and/or the pump arrangement are also connected to the evaluation unit into which a program is implemented that opens the shut-off element and/or activates the pump arrangement until a predefinable pressure value has been reached if values fall below the predefined consumption value and/or above the predefined pressure value of the pressure sensor in the measuring vessel.

According to an additional characteristic of the invention, the measuring arrangement is characterized in that the condition measuring arrangement contains the pump arrangement whereby parameters of the pump arrangement are determined in the evaluation unit as representative values for the condition of the operational fluid. An otherwise necessary system component can thereby be included in an advantageous manner for the determination of a condition parameter.

If the pump arrangement according to the invention has a viscosity-dependent characteristic and is preferably realized as a gear pump, then a conclusion can be made about the condition of the operational fluid, especially its viscosity through inquiry of the rotational speed at constant power or inquiry of the power required for a constant rotational speed.

Of course, it is also conceivable that the condition measuring arrangement contains a separate sensor arrangement to determine a condition parameter. Provided can thereby turbidity measuring devices, sensors to determine electric or magnetic characteristics, etc., in addition to the measuring arrangement for quantities and consumption measuring.

The advantages to be able to give information in a systematic and simple manner also about the admissible or the possible validity of specific parameters of the operational fluids and about other measuring and testing results are achieved for the afore-described measuring method to characterize the physical and/or chemical condition of the operational fluid of an engine in that a usability potential of the operational fluid is determined in the evaluation unit from the quantity parameter and from at least one condition parameter.

According to an additional characteristic of the invention, the values of the usability potential are compared in the evaluation logic to predefined desired values or admissible ranges and deviations are indicated therein to be able to evaluate the sensibility of the quantity or consumption measurements or the dependability of the values determined thereby—or to be able to evaluate at all the testing process as a whole and/or the proper function of the test piece during the testing process.

It is advantageously proposed thereby that the quantity parameter of the operational fluid as well as one or all condition parameter(s) linked to the usability potential are determined for the characterization of the physical and/or chemical condition of the operational fluid simultaneously or at least nearly the same time.

According to an advantageous embodiment version of the inventive measuring and testing method, specific base measuring results or base parameters, the determination of the quantity parameter of the operational fluid, as well as one or all condition parameter(s) linked to the usability potential are used as a basis for the characterization of the physical and/or chemical condition of the operational fluid.

Keeping the advantage of the accuracy of gravimetric or intermittent quantity determination known from prior art and to be able to maintain a system that is simple to install and connect, and which can also be connected and operated while the engine is running and to maintain thereby information about the usefulness of the measured values or of the entire testing process can be achieved as follows: At least one part of the operational fluid is removed from the engine and placed into a measuring vessel wherein at least the momentary supply of the operational fluid available for the engine is determined and whereby at least one associated condition parameter of the operational fluid is determined in a condition measuring arrangement for each such supply measurement.

It is furthermore advantageously proposed that the consumption of the operational fluid in the engine is determined.

To be able to construct the system as simple as possible by avoiding unnecessary pressure switches, the method is characterized according to an additional embodiment of the invention in that all operational fluid, except for a determinable residual amount in the engine, is placed in a measuring vessel arranged in the vicinity of the engine whereby the pressure caused thereby at the bottom of the vessel is measured and the quantity of operational fluid in the measuring vessel is thus determined in the evaluation unit, and whereby the consumed quantity of operational fluid is determined possibly from at least two measurements.

According to an advantageous embodiment version of the method it is proposed that the time gradient of the pressure values in the measuring vessel is determined during suctioning of the operational fluid from the engine and pumping is stopped after a predefinable period when values fall below a freely determinable threshold value. Suctioning of operational fluid from the engine is therefore stopped only after the pump has already suctioned gas or a mixture of operational fluid and gas from the vicinity of the input region of the adapter. The amount of operational fluid disposed in the connecting line, including the fluid film on the walls and possible droplets etc. are practically completely pumped into the measuring vessel. The evaluation of the course of the pressure gradient additionally gives information about the density of the drawn operational fluid, at least relative to other measurements.

The uninterrupted operation of the engine to be tested can be ensured by maintaining the predetermined level of operational fluid if operational fluid is advantageously fed from the reservoir into the measuring vessel until a predefinable pressure value has been reached, while values exceed the predefinable consumption value and/or while values fall below a predefinable pressure. In addition, the sensor disposed in the measuring vessel can be protected against temperature shocks by the continuous equal amount of operational fluid placed into the measuring vessel whereby said operational fluid can be conditioned as desired.

The determination of the condition parameter is advantageously performed on the engine for the amount of operational fluid taken for the supply measurement and consumption measurement.

According to another embodiment version of the invention it can also be proposed that the operational fluid is fed to a measuring arrangement that is different from the supply measuring arrangement to determine the condition parameters. Any desired condition parameter can be determined thereby, independent from the parameters which could possibly play a role in the determination by means of the supply measuring arrangement.

The invention will be explained in more detail in the following with reference to the attached FIGURE.

BRIEF DESCRIPTION OF THE FIGURE

The accompanying FIGURE schematically shows a measuring and testing system for lubricating oil in an internal combustion engine according to the present invention.

DETAILED DESCRIPTION OF THE PREFERRED EMBODIMENT

A measuring vessel 4 is connected to a crankcase sump 2 of an internal combustion engine 1 through a connecting line for quantitative determination of the consumption of lubricating oil contained in the internal combustion engine 1 or its crankcase sump 2 whereby the measuring vessel 4 can be arranged at any desired position relative to the internal combustion engine 1. The measuring vessel can also be heated as necessary and it is provided with a pressure sensor 5 at the bottom whose output signals are processed in an evaluation unit 6. The consumed amount of lubricating oil is determined in the evaluation unit 6 from the hydrostatic pressure in the measuring vessel 4 with the amount of lubricating oil disposed therein or through comparison of two successive measurements which determine the consumed amount of lubricating oil between those measurements. The pressure sensor 5 is preferably tared or reset before each measurement to possibly take into consideration the lubricating oil remaining in the measuring vessel 4 from the previous measurement.

A preferably reversible pump arrangement 7 is positioned in the connecting line 3 whereby the pump arrangement 7 suctions a predetermined amount of lubricating oil from the crankcase sump 2 through an adapter 8, which maintains a constant dipping depth defined by said crankcase sump for each subsequent measurement, and whereby the pump arrangement 7 moves the lubricating oil into the measuring vessel 4 advantageously through a dirt screen (not illustrated in the drawing). The entire amount of lubricating oil can possibly be suctioned from the internal combustion engine 1 and fed into the measuring vessel 4.

The adapter 8 is preferably inserted into the already existing opening of the crankcase sump 2 on the internal combustion engine 1, for instance the oil level control opening. A connection through the oil drain opening of the internal combustion engine would also be possible. A secure attachment of the adapter is very important in all cases since any change of the extraction position could falsify the determined consumption value—may this be by lifting, lowering, swiveling or rotating.

The transporting direction of the pump arrangement 7 is reversed after completion of the measurement and the lubrication oil is moved again from the measuring vessel 4 to the crankcase sump 2 of the internal combustion engine 1.

The pump unit 7 is also connected to the evaluation unit 6 controlling the operation of the pump unit 7 whereby the pump must also be able to transport for a short period a fluid-gas mixture or gas only for reasons explained below. The ending of suction is detected through determination of the oil level gradient in the measuring vessel 4 to be able to eliminate mainly additional pressure switches. Pressure values in the measuring vessel 4 are detected by the pressure sensor 5 and a time gradient is determined in the evaluation unit 6 during suctioning of the lubricating oil from the internal combustion engine 1 and when values fall below a freely determined threshold value, the evaluation unit 6 turns off the pump arrangement 7 and stops thereby the pumping action. The pumping action is advantageously stopped only after a predefinable period after values fall below the threshold value so that the best possible precision in measuring is guaranteed by including as much as possible the entire amount of lubricating oil in the adapter 8, the connecting line 3, the pump arrangement 7, including the oil film on walls and possible droplets. One prerequisite for this is, of course, that air bubbles in the measuring vessel 4 do not cause any inadmissible foaming and cause no consumption errors in any case, which could easily be the case in quantity determination using the pressure value in the measuring vessel 4.

Information about the course of the pressure gradient can nevertheless be given through a condition parameter, namely the density and/or the viscosity of the lubricating oil, which changes through the import of motor fuel, for example, and which can falsify the oil consumption measurement or make it useless. With an identical system design relative to tube diameter, tube lengths, etc., and at constant transporting volume of the pump arrangement 7, the oil level in the measuring vessel 4 changes exactly the same along with each measurement up to a maximal level per time unit, while the pressure increases proportional to the density of the lubricating oil. An evaluation logic is therefore implemented in the evaluation unit 6, which links the consumption as a relevant quantity parameter with the density condition parameter according to a predefinable relationship and determines thereby the usability potential of the operational fluid, i.e., the lubricating oil.

A relative change in the condition of the lubricating oil can at least be concluded by the observed measurement in the change of the testing process. This example shows that the measuring arrangement for the supply measuring arrangement or the consumption measuring arrangement can be the same in terms of equipment while it is functionally different. Coupling of measuring technologies is derived from the example above since quantity parameters as well as condition parameters make up together the value of the pressure sensor 5 in the measuring vessel 4. The detection of the course of the pressure increase and the determination of the pressure value in the measuring vessel 4 show directly that a relationship exists in terms of the measuring technology through the direct closeness in time.

A module is advantageously implemented in the evaluation logic of the evaluation unit 6 which compares and indicates deviations of the values of the usability potential determined according to the method above and of the predefinable and possibly adjustable desired values or admissible ranges stored in the evaluation unit 6. This can be a simple warning signal about the deficiency in consistency or plausibility of the individual measured values or of the entire testing process as well—or it can be a more exact indicator about an appearing inadmissible event or the measurement showing a deviating measured value from the predetermined range.

Similar is the situation in oil level measurements taken by means of ultrasound whereby the transit times in the operational fluid is compared, at the one hand, ranging up to the reference point, and on the other hand, up to the fluid level to be measured, either simultaneously or at least immediately following each other and the transit times are compared by means of the same measuring arrangement. The first measurement shows the acoustic velocity used as condition parameters, possibly in measuring the sound dissipation, and additionally the viscosity of the fluid, and the second measurement shows the oil level and thereby the supply measurement. A combination of values of an additional pressure sensor determined at the same time or a short period apart provides also the density and the compressibility of the operational fluid.

One example of the condition parameters on an electric basis is oil level measuring by means of a capacitive oil level sensor. The fluid level is determined through comparison of the value of the reference capacitor and of the measuring capacitor. However, the reference capacitor provides with its known parameters at the same time the dielectric constant of the measured fluid, which can again be used as condition parameter. The supply measuring arrangement is here also the functionally different condition measuring arrangement even if they are clearly the same relative to equipment.

Partial overlapping of the quantity or supply measuring arrangement and the condition measuring arrangement occurs, for example, if the parameters of the supply measuring arrangement associated with the pump arrangement 7 are also used for the determination of a condition parameter, e.g., the viscosity of the lubricating oil. If the pump arrangement 7 has a strong viscosity-dependent characteristic, such as in the case of an advantageously employed gear pump, then the viscosity of the transported operational fluid can be determined by keeping one pump parameter constant, e.g., the pump capacity, and by measuring the second parameter associated with the characteristic, e.g., the transporting capacity.

Of course, possible are also measuring arrangements for supply parameters and condition parameters that are completely different relative to equipment. A separate density measurement could be provided or the determination of electric or magnetic values in additional measuring arrangements could be used, which do not overlap equipment in terms of equipment with the measuring arrangement for supply measurements or consumption measurements. An automatic replenishing device is connected directly to the measuring vessel 4 through a line 9 whereby said replenishing device consists of a reservoir 10 for the lubricating oil to be used in the internal combustion engine 1 and a shut-off element and/or an additional pump arrangement 11, whereby the pump arrangement 11 is also connected to the evaluation unit 6. A program is implemented in the evaluation unit 6 which activates the additional pump arrangement 11 when values exceed a predefinable consumption value or when values fall below a predefinable pressure value of the pressure sensor 5 in the measuring vessel 4 whereby the pump 11 remains activated until a predefinable pressure value has been reached, which means, until preferably the original level of the lubricating oil has been established again in the crankcase sump 2 of the internal combustion engine 1.

Even during reverse pumping of the lubricating oil from the measuring vessel 4 into the crankcase sump 2, it is an advantage if the reverse pumping is stopped only after a predefinable period after emptying of the measuring vessel 4 as detected by the pressure sensor 5 so that there is ensured, as much as possible, the return of the entire lubrication oil disposed in the measuring vessel 4, the adapter 8, the connecting line 3, the pump arrangement 7, including the oil film on the walls and possible droplets, etc.

Another measurement can be taken with the pressure sensor 5 after completion of the reverse pumping action to take into consideration any lubrication oil possibly remaining in the measuring vessel 4 to determine the consumption value correctly. In any case, it is advantageous for the protection of the pressure sensor 5 against a temperature shock if a specific amount of lubricating oil remains in the measuring vessel 4 at all times. Moreover, measurement precision can be increased through this measure since the dependence on temperature has been reduced. A precisely defined amount of lubricating oil can be moved from the reservoir 10 into the measuring vessel before each measurement to protect the pressure sensor against the temperature shock.

The adapter 8 can be designed essentially in the way of a siphon and essentially with a U-shaped end turned backwardly toward the top in the inlet area of the crankcase sump 2.

The evaluation unit 6 itself can be connected to additional measuring devices, evaluation devices, memory devices 12 or the like, which accomplish the most diverse tasks or make further processing of the measurement results possible.

Oil consumption of a compressor, fuel consumption of an internal combustion engine, or consumption of a coolant could be determined in the same or similar manner whereby, in the latter case, the antifreeze effectiveness in the form of the content of antifreeze agent, which is again caused by the density of the coolant, can be used as a condition parameter. The basic principles of the system and method introduced in the following could also be used to determine the consumption of preferably conditioned combustion air of an internal combustion engine whereby one or several of the conditioned values of the combustion air are taken into consideration, i.e., pressure, temperature, humidity, etc.

The invention claimed is:

1. A measuring and testing method for determining a usability potential of at least one operational fluid of a test piece, comprising the steps of: directly measuring a quantity parameter of the operational fluid, independently determining at least one condition parameter, and linking said quantity parameter and said at least one condition parameter of the operational fluid according to a predetermined relationship for determining the usability potential of the operational fluid, wherein determining the at least one condition parameter comprises directly measuring at least one actual chemical and/or physical parameter of the operational fluid itself.

2. A measuring and testing method according to claim 1, including a step of comparing values of the usability potential in the evaluation logic to predefined desired values or admissible ranges and deviations are indicated therein.

3. A measuring and testing method according to claim 1, including determining the quantity parameter of the operational fluid as well as one or all condition parameter(s) linked to the usability potential for the characterization of the physical and/or chemical condition of the operational fluid simultaneously or at least nearly the same time.

4. A measuring and testing method according to claim 3, wherein specific base measuring results or base parameters, the determination of the quantity parameter of the operational fluid, as well as one or all condition parameter(s) linked to the usability potential are used as a basis for the characterization of the physical and/or chemical condition of the operational fluid.

5. A method to determine at intervals a usability potential of at least one operational fluid employed in an engine (1) in a method according to claim 4, including removing at least one part of the operational fluid from the engine (1) and placing said at least one part in a measuring vessel (4) wherein at least a momentary supply of the operational fluid available for the engine (1) is determined and whereby at least one associated condition parameter of the operational fluid is determined in a condition measuring arrangement for each such supply measurement.

6. A method according to claim 5, including determining the consumption of the operational fluid in the engine (1).

7. A method according to claim 5, including placing operational fluid from the engine (1) in a measuring vessel (4) arranged near the engine (1) whereby pressure caused thereby at the bottom of the measuring vessel (4) is measured and the quantity of operational fluid in the measuring vessel (4) is thus determined in the evaluation unit (6), and whereby the consumed quantity of operational fluid is determined possibly from at least two measurements.

8. A method according to claim 7, including determining a time gradient of the pressure values in the measuring vessel (4) during suctioning of the operational fluid from the engine (1) and stopping pumping after a predefinable period when values fall below a freely determinable threshold value.

9. A method according to claim 7, including feeding operational fluid from a reservoir (10) into the measuring vessel (4) until a predefinable pressure value has been reached, while values exceed the predefinable consumption value and/or while values fall below a predefinable pressure in the measuring vessel (4).

10. A method according to claim 9, including determining the condition parameter for the amount of operational fluid taken for the supply measurement and consumption measurement.

11. A method according to claim 10, including feeding the operational fluid to a measuring arrangement that is different from the supply measuring arrangement to determine the condition parameters.

12. A measuring and testing system with means for determining a usability potential of an operational fluid of a test piece with at least one measuring arrangement connected to a space of the test piece containing the operational fluid, comprising a first partial measuring arrangement for directly measuring a quantity parameter of the operational fluid and a control and evaluation unit connected to the measuring arrangement, comprising an evaluation logic for linking the quantity parameter with at least one condition parameter of the operational fluid according to a predetermined relationship for determining the usability potential of operational fluid, and an additional, second partial measuring arrangement, functionally different from the first partial measuring arrangement, for directly and individually measuring at least one actual chemical and/or physical parameter of the operational fluid, and wherein the control and evaluation unit is connected also to the second partial measuring arrangement, the evaluation logic determining the at least one condition parameter of the operational fluid from the at least one chemical and/or physical parameter.

13. A measuring and testing system according to claim 12, wherein a module is implemented in the evaluation logic which compares and indicates deviations of values of the usability potential with predefinable desired values or admissible ranges.

14. A measuring and testing system according to claim 12, wherein at least one part of the measuring arrangement for the quantity parameter is also a part of the measuring arrangement of the condition parameter.

15. A measuring and testing system according to claim 12, wherein at least one part of the measuring arrangement for the quantity parameter is linked in the way of the measuring technology to a part of the measuring arrangement for the condition parameter.

16. A measuring arrangement in a measuring and testing system according to claim 12, to determine at intervals the usability potential of at least one operational fluid used in an engine (1), comprising a connecting line (3) to a space (2) in the engine (1) containing the operational fluid, a measuring vessel (4) fillable with the operational fluid through a connecting line, and an evaluation unit (6), including at least one supply measuring arrangement (4, 5, 6) which includes the measuring vessel (4) equipped with a device to detect at least a momentary supply of the operational fluid available to the engine (1), and a condition measuring arrangement in which at least one condition parameter of the operations fluid is determined.

17. A measuring arrangement according to claim 16, wherein the supply measuring arrangement is equipped with a device to determine an amount of operational fluid consumed by the engine (1).

18. A measuring arrangement according to claim 17, wherein the supply measuring arrangement (4, 5, 6, 7) is connected to the engine with a connecting line (3) which is provided with an adapter (8) that can be inserted on a side of the engine (1) into an existing opening of the engine (1) at a predetermined height, wherein a pump arrangement (7) is placed in the connecting line (3), and wherein the detection determination is made of an amount of operational fluid consumed by the engine (1) from successive measurements in and evaluation unit of the measuring arrangement.

19. A measuring arrangement according to claim 18, wherein the supply measuring arrangement comprises a pressure sensor (5) on the bottom of the measuring vessel (4) to detect the amount of operational fluid contained in the measuring vessel (4) and an evaluation unit (6) to which the pressure sensor is connected.

20. A measuring arrangement according to claim 18, wherein the pump arrangement (7) is connected to the evaluation unit (6) into which a program has been implemented and which determines during the suction operation of the pump arrangement (7) a time gradient of the pressure values supplied by the pressure sensor (5) and whereby said program turns the pump arrangement (7) off after a defined interval and after values fall below a freely determinable threshold value.

21. A measuring arrangement according to claim 17, wherein the measuring vessel (4) is connected to a reservoir (10) filled with operational fluid used in the engine (1) through a closable connecting line (9) which includes a pump arrangement (11).

22. A measuring arrangement according to claim 21, wherein at least one of a shut-off element and a pump arrangement (11) are also connected to the evaluation unit (6) into which a program is implemented that opens the shut-off element and/or activates the pump arrangement (11) until a predefinable pressure value has been reached if values fall below a predefined consumption value and/or above the predefined pressure value of the pressure sensor (5) in the measuring vessel (4).

23. A measuring arrangement according to claim 22, wherein the condition measuring arrangement (6, 7) contains the pump arrangement (7) whereby parameters of the pump arrangement (7) are determined in the evaluation unit as representative values for the condition of the operational fluid.

24. A measuring arrangement according to claim 23, wherein the pump arrangement (7) has a viscosity-dependent characteristic and is realized as a gear pump.

25. A measuring arrangement according to claim 24, wherein the condition measuring arrangement contains a separate sensor arrangement for the determination of a condition parameter.

* * * * *